United States Patent [19]
Su et al.

[11] Patent Number: 5,766,528
[45] Date of Patent: Jun. 16, 1998

[54] CERAMIC TAPE FORMULATIONS WITH GREEN TAPE STABILITY

[75] Inventors: Wei-Fang Su, Murrysville; Deborah P. Partlow, Export, both of Pa.

[73] Assignee: Northrop Grumman Corporation, Los Angeles, Calif.

[21] Appl. No.: 800,489

[22] Filed: Feb. 14, 1997

[51] Int. Cl.$^6$ .................................................. C04B 35/622
[52] U.S. Cl. .......................... 264/109; 264/619; 264/650; 264/166; 156/89
[58] Field of Search ........................... 264/650, 109, 264/166, 619; 156/89

[56] References Cited

U.S. PATENT DOCUMENTS

| | | | |
|---|---|---|---|
| 2,966,719 | 1/1961 | Park | 264/650 |
| 3,998,917 | 12/1976 | Adelman | 264/650 |
| 4,353,958 | 10/1982 | Kita | 264/650 |
| 4,729,058 | 3/1988 | Gupta | 361/321 |
| 4,968,460 | 11/1990 | Thompson | 264/6 |
| 5,393,604 | 2/1995 | Sanchez | 156/89 |

OTHER PUBLICATIONS

"Boron, Metallo–Boron Compounds and Boranes" edited by Roy M. Adams Geneva College, Beaver Falls, PA. Interscience Publishers, 1964, pp. 72–77, 94–97.

"The Organic Chemistry of Boron" by W. Gerrard, Head of Department of Chemistry, Mathematics, Bioloyg and Geology, The Northern Polytechnic, London, Academic Press, 1961, pp. 18–21.

*Primary Examiner*—James Derrington
*Attorney, Agent, or Firm*—Walter G. Sutcliff

[57] ABSTRACT

A method for producing ceramic tape used to fabricate electronic devices while eliminating continued shrinkage of the unfired tape. Chemical agents are added to a mixture of ceramic powder and binder to manipulate the crosslinking of the binder. A first approach involves promoting the crosslinking reaction to completion quickly. The second approach involves preventing the crosslinking reaction during the tape slurry mixing and casting processes. A solvent is used to accelerate the crosslinking of the binder in which the solvent may include one or more of acetone, acetylacetone, toluene and ethanol. Preferably, the solvent is a combination of acetone and acetylacetone. A polyhydroxy compound, such as glycerine, may be added to accelerate the crosslinking reaction of the binder. The boron in the tape may alternatively be rendered inoperative as a crossing agent for the binder by pre-reacting the boron with the Lewis base prior to contact with the binder. The preferred Lewis base is an organic amine, such as piperidine.

12 Claims, 1 Drawing Sheet

CERAMIC TAPE FORMULATIONS WITH GREEN TAPE STABILITY

BACKGROUND OF THE INVENTION

1. Field of the Invention

This invention relates generally to ceramic tapes used in fabricating multilayered electronic elements having high frequency requirements, and more particularly to means for improving the dimensional stability of such tapes.

2. Description of the Prior Art

Sol-gel derived silica-based powders exhibit low dielectric constant and low loss. These are desirable properties for electronic packages used in high frequency (microwave/ millimeter) applications such as guidance systems, i.e., radar. To form ceramic electronic substrates from such powder, two stages are involved. First, the tape casting process converts powder into easily handable ceramic tapes. Then, the multilayered ceramic process produces electronic packages from the tapes.

The tape casting process 10 is depicted in FIG. 1. The ceramic powder is mixed for tape casting as a slurry or slip. First, the powder is calcined and the powder is added 12, the binder is added 22, the dispersants are added 14, the plasticizer is added 24 and a solvent is added 16 in a container that has grinding balls or some other media for grinding 18. The grinding media performs two functions. First, if soft lumps have formed in the powder, the grinding media will break apart those lumps. Second, the grinding media will also mix the ingredients so that they are homogenized. Then, the ingredients are placed on a mill and milled 20 for a given period of time so that the slip is homogenized and has a smooth, creamy consistency. The slip is de-aired 26 and filtered 28.

A tape is then produced 30. First, a section of Mylar™ or some other backing material is positioned. Then, the slip is cast upon the Mylar™ backing into a thin sheet, such as by providing the slip upon the backing and then moving the backing relative to a blade (or moving the blade relative to the backing) so that the slip is spread in an even coat over the backing. The resulting tape is wet and is then heated or air dried, leaving a finished, unfired tape.

Electronic packages may then be produced from the tapes in a process 40 depicted in FIG. 2. The tape is typically cut into squares and the Mylar™ is stripped off the unfired tape. That tape might receive a screen-printed pattern of metal circuitry. The unfired tape might have one or more holes punched through it 42 forming vias and each via would have a conductive metal, such as gold, introduced into the via 44 providing a vertical connection between one layer and a layer above or below that layer. A metallized pattern may also be provided on selected layers 46. In this way, three dimensional patterns of metal can be formed. The metal patterns may form coils, groundplane, stripline or slotline. The metal is preferably applied as a powder that is in a paste having a solvent and binders and is preferably applied to the tape through screen printing.

Each metallized layer is then stacked in a prescribed order and is put through a process called lamination 48. The lamination process involves pressing the layers together, usually under a controlled pressure. Usually the lamination process is conducted with some added heat because the binder in the ceramic tape becomes somewhat tacky when heated so that the layers stick together better. After the lamination process, the flexibility of the metallized stack of layers is lost, leaving a more rigid part which may then be trimmed to shape 50. Then, the stack is fired in an oven under a controlled temperature, heating rate and atmosphere 52.

The tape prior to sintering is called green tape. As noted above, during fabrication of a multi-layered device of ceramic tape, the Mylar™ backing is peeled off of the tape while the tape is still in the unfired state and is flexible (i.e., still has binder and plasticizer in it). Then, the conductor lines are screen printed onto the tape and holes (vias) are punched in the green tape. The vias are used for layer-to-layer circuit connections and process alignment throughout the fabrication process.

To maintain the positive location of the vias, the green tape has to be stable, that is, less than 0.04% shrinkage in about two weeks' working period (which time period is typical of the multilayer ceramic process). However, current silica-based tape for microwave electronic package shrinks more than 0.4% in two weeks. Shrinkage of 0.04 percent is unacceptable because this amount represents an entire via diameter. Thus, shrinkage of 0.04 percent or greater may cause the screen printed pattern and vias of one tape to not line up with patterns and vias provided on other, adjacent pieces of tape.

Under current component manufacturing methods, tape obtained from commercial sources is taken off the Mylar™ backing and is put into an oven at approximately 70° C. in loose sheets for 30 minutes. This baking will cause the tape to shrink a small amount. However, even the baked tape will continue to shrink after baking and the tape will not quit shrinking for approximately a month.

Therefore, a method is needed to eliminate the continued shrinkage problem of green tape used to fabricate electronic packages.

SUMMARY OF THE INVENTION

A method is provided for producing ceramic tape used to fabricate electronic devices which solves the continued shrinkage problem associated with green tape. The method involves mixing ceramic powder and a binder, adding chemical agents to the components of the ceramic tape to manipulate crosslinking of the binder, and casting the mixture of the ceramic powder, the binder and the binder-manipulating chemical agent as a tape.

The ceramic powder preferably contains boron and the binder is preferably a condensation product of polyvinylalcohol and aldehyde.

where $R=C_n H_{(2n+1)}$ and n=0 to 10) such as polyvinylformal, polyvinylacetal, polyvinylpropional and polyvinylbutyral.

Two general types of approaches are discussed. The first approach involves promoting the crosslinking reaction to completion quickly. The second approach involves preventing the crosslinking reaction during the tape slurry mixing and casting processes.

The particular approaches to solving the shrinkage problem include one or more of the following: (1) utilizing a novel solvent mixture, preferably of acetone and acetylacetone, (2) utilizing the novel solvent mixture plus polyhydroxy additives, (3) utilizing a combination of the novel solvent mixture and organic base additives such as amines, or (4) utilizing a combination of the novel solvent mixture plus polyhydroxy additives and organic base additives in the tape formulation.

A solvent is preferably used in the tape while the tape is a slip to accelerate crosslinking of the binder. The solvent may include one or more of acetone, acetylacetone, toluene and ethanol. The solvent is preferably a combination of acetone and acetylacetone. A polyhydroxy compound, such as glycerine, may be added to accelerate the crosslinking reaction of the binder.

The boron in the tape may alternatively be rendered inoperative as a crosslinking agent for the binder by pre-reacting the boron with a Lewis base prior to contact with the binder. The Lewis base is preferably an organic amine such as piperidine.

Other objects and advantages of the invention will become apparent from a description of certain present preferred embodiments thereof shown in the drawings.

DETAILED DESCRIPTION OF THE PREFERRED EMBODIMENTS

Figure 1:
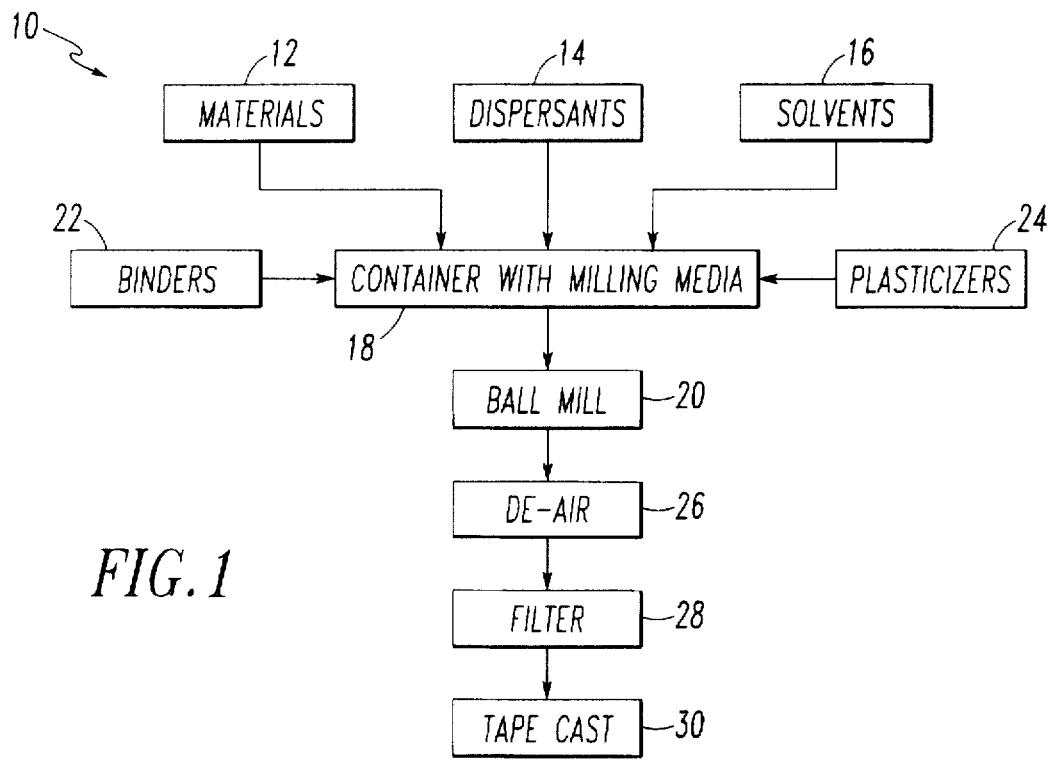
FIG. 1 is a block diagrammatic depiction of a process for producing ceramic tape from powder.
Figure 2:
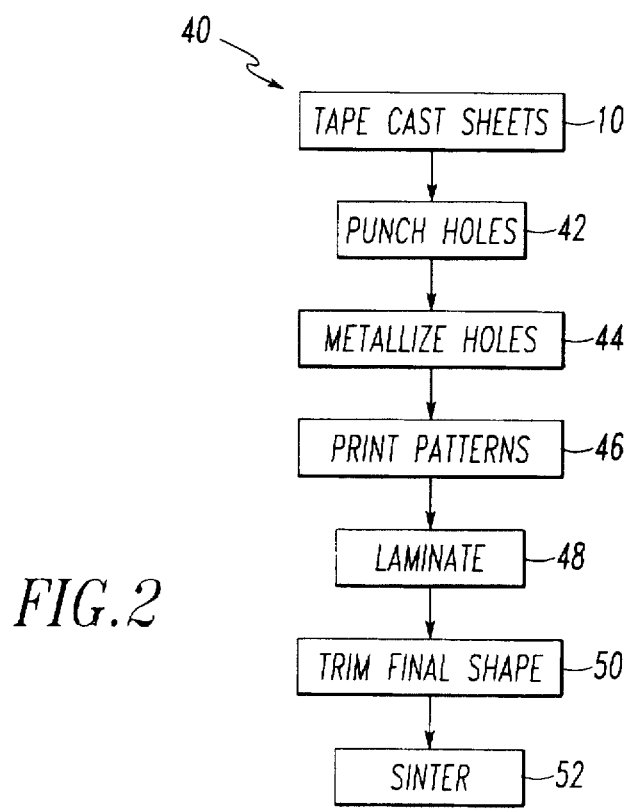
FIG. 2 is a block diagrammatic depiction of a process for producing electronic packages from multiple layers of ceramic tape.

In general, the shrinkage of green tape may be due to (1) the loss of volatile ingredients, (2) chemical reactions among the ingredients of the tape formulation and (3) reactions among the ingredients of the tape formulation with air or moisture. Table 1 shows a typical composition of silica-based tapes.

TABLE 1

Composition of Silica-Based Tapes

| Component | Weight % |
|---|---|
| Toluene | 21 |
| Alcohol | 14 |
| Borosilicate glass | 30 |
| Quartz | 20 |
| Polyalkylene glycol (dispersant) | 3 |
| Polyvinylbutyral (binder) | 6 |
| Phthalates (plasticizer) | 6 |

The sol-gel borosilicate powder contains about 23% by weight of boron oxide ($B_2O_3$) to allow a sintering temperature below 1000° C. necessary for gold metallization. Boron oxide is a mobile and chemically active component. It migrates to the surface of the tape and forms a loose, dusty powder. The powder fills the punched holes and prevents patterns from being cleanly printed on the tape. By adding water (~3%) into the formulation, the mobile boron oxide changes into stable boric acid, and the tape is no longer powdery.

In the coating industry, boric acid has been used as a crosslinking agent for polyvinylbutyral. The polyvinylbutyral is a condensation polymer of polyvinyl alcohol and butylaldehyde and contains hydroxy groups on the polymer chain. Polyvinylacetal is another binder which is often used. The boric acid reacts with the hydroxy group in the binder, i.e., the polyvinylbutyral. The shrinkage problem of silica-based tapes is therefore likely due to the continued crosslinking reaction between polyvinylacetal and boric acid in the tape formulation, even after the tape is cast and dried.

Based on this finding, two approaches to solving the shrinkage problem are provided herein. The first approach involves promoting the crosslinking reaction to completion quickly. The second approach involves preventing the crosslinking reaction during the tape slurry mixing and casting processes.

To promote crosslinking, a solvent system is used which enhances reactions between boric acid and polyvinylbutyral. The addition of a polyhydroxy compound such as glycerin also increases the acidity of boric acid, which in turn promotes cross-linking. Thus, as soon as the tape is cast and dried, all of the cross linking occurs within a very short time and all of the shrinking, therefore, occurs in the same short time.

On the other hand, if it is desired to instead prevent crosslinking, the boric acid can react with another agent prior to contact with the polyvinylbutyral and render the boric acid inoperative as a crosslinking agent for the polyvinylbutyral. Boric acid is a Lewis acid, which reacts with a Lewis base, such as an organic amine, to form a neutral complex. The neutral complex cannot react with polyvinylbutyral thus crosslinking is prevented.

As mentioned, these reactions require use of the proper solvent system. Table 2 summarizes the results of crosslinking reactions using various solvents and additives.

TABLE 2

Results of Crosslinking Reactions of Polyvinyl Acetal (Monsanto B98) Using Various Solvents and Additives

| | Extent of crosslinking with 0.5 ml aqueous solution of | | | | |
|---|---|---|---|---|---|
| 5 ml of 3% B98 in the Solvent (% V) of | Bor/Gly/Am (pH = 8.2) | Bor/Gly (pH = 2.6) | Boric acid (pH = 2.8) | Bor/Am (pH = 8.1) | Bor/xs.Am (pH = 11.4) |
| Acetylacetone (100) | slight cloudy | cloudy | cloudy | cloudy | cloudy |
| Acetone/acetylacetone (86:14) | cloudy | gel | gel and cloudy | clear | clear |
| Methylethylketone (100) | clear | clear separation | clear separation | — | clear separation |
| Methylethylketone/toluene (50:50) | cloudy | very cloudy | very cloudy | — | cloudy |
| Ethanol (100) | clear | clear | clear | clear | clear |
| Toluene/ethanol (60:40) | slight cloudy | very cloudy | very cloudy | — | cloudy |

*Bor/Gly/Am: 2 g boric acid, 3.51 g glycerin, 1.5 ml piperidine in 40 ml deionized water.
Bor/Gly: 2 g boric acid, 3.51 g glycerin in 40 ml deionized water.
Boric acid: 2 g boric acid in 40 ml deionized water.
Bor/Am: 2 g boric acid, 0.8 ml piperidine in 40 ml deionized water.
Bor/xs.Am: 2 g boric acid, 4.0 ml piperidine in 40 ml deionized water.

A mixture of acetylacetone and acetone has been shown to be the most promising solvent system for the intended purpose, whether the approach is to promote fast crosslinking (gellation) or to prevent crosslinking (clear solution). The solvent systems in Table 2 were used to make various formulations for tape casting. The exact composition and preparation procedures are described in the examples. The shrinkage was measured for each formulation and is listed in Table 3.

TABLE 3

Percentage Shrinkage of Various Tape Formulations

| Formulation | % Shrinkage in ten days after 70° C./16 hrs Pretreatment |
|---|---|
| Acetylacetone/acetone/piperidine | 0.02 |
| Acetylacetone/acetone | 0.03 |
| Toluene/ethanol | 0.13 |
| Toluene/ethanol/piperidine | 0.04 |
| Toluene/MEK/triethanolamine | 0.24 |
| Toluene/MEK/octadecylamine | 0.10 |

It is understood that, although the focus of the present invention is a borosilicate-based ceramic tape, other ceramic tapes containing no boron also exhibit unwanted shrinkage over prolonged periods of time, interfering with the efficient production of ceramic packages using such tapes. One example is aluminum oxide ceramic tape; in this case the shrinkage may be due to the loss of absorbed solvent on the ceramic particle surface; however, the approaches disclosed herein are applicable whenever a binder crosslinking problem occurs. Moreover, it is further understood that although polyvinylbutyral is the preferred binder, other binders such as polyvinylacetal may be effectively utilized in connection with the present invention.

As shown in Table 3, acetylacetone and acetone is the preferred solvent system to promote crosslinking and reduce shrinkage. Piperidine is the preferred amine to prevent crosslinking and reduce shrinkage. The results are consistent with the results shown in Table 2.

Tape Preparation

EXAMPLE 1

Tapes with Acetylacetone/Acetone

On the first day, 1.31 grams of dispersant, NP-10 (Union Carbide), 1.6 grams of high-resistivity water (very pure water prepared in-house for semiconductor work) and 15 grams of solvent mixture (made from 172 ml acetone and 28 ml acetylacetone) were added and mixed well in a 250 ml polypropylene bottle. Then, 13.0 grams of borosilicate glass powder and 8.75 grams of quartz were added into the mixture and ball milled overnight using 10 mm diameter $ZrO_2$ balls. On the second day, 0.2 gram of binder, Butvar B79 (Monsanto) was added into the mixture and ball milled for one hour. Then 2.41 grams of B79, 2.61 grams of plasticizer, Santicizer 160 (butyl phthalate from Monsanto) were added into the bottle and milled for about 3 hours to obtain a creamy, smooth mixture known as a slip or slurry. The slip was cast on a carrier of Fujimori Mylar™ using a 6 inch wide doctor blade having a 16 mil gap at 14 ft/min at room temperature.

EXAMPLE 2

Tapes with Acetylacetone/Acetone/Piperidine

The procedure is the same as above except that 3.66 grams of piperidine was added into the mixture after the first day of milling and the mixture was re-milled overnight. On the third day the procedure was repeated as described for the second day of example 1.

Shrinkage Measurement Procedure

The green tape shrinkage measurements reported in Table 3 were done by cutting 5.25-inch square pieces of tape and removing the Mylar™ backing. A square pattern of 4-mil diameter holes was then punched through each sheet using a precision via-punching machine (Ushio Punch). Thus each sheet of tape had a hole near each corner, and the location of the holes was precisely controlled by the via punching machine. Distance between holes was therefore precisely known.

The tape sheets were then "stabilized" by heating overnight in a flowing nitrogen atmosphere at 70° C., which is intended to drive off residual solvent and promote tape shrinkage; thus, stabilized tape is not expected to shrink a great deal after this step. (Continued shrinkage will contribute to errors in layer-to-layer alignment of tape in multilayer ceramic packages, since via punching, metal via filling, and metal conductor printing are done on successive days, and the metal features must not differ in their spacings).

After stabilization, the distance between holes was precisely measured by holding the sheet of punched tape in a fixed position on a flat, porous stage using a mechanical vacuum, and locating each hole on a high-precision X-Y translator equipped with a high-magnification video system. X-Y coordinates for each hole on each sheet of tape were recorded. The difference in spacings between holes before and after stabilization was calculated as percent shrinkage. Thereafter, the tape was stored in flowing dry nitrogen at room temperature, and every few days each sheet of tape was again positioned on the stage described above and the X-Y coordinates of each hole on each sheet of tape were again recorded. In this manner, the shrinkage as a function of time was determined for each tape.

While certain present preferred embodiments have been shown and described, it is distinctly understood that the invention is not limited thereto but may be otherwise embodied within the scope of the following claims.

We claim:

1. A method for producing ceramic tape used to fabricate electronic devices which result in reduced shrinkage occurring over time in the tape, the method comprising:

mixing a boron-containing ceramic powder, and a binder which is a condensation product of polyvinylalcohol and an aldehyde;

adding chemical agents to the components of the ceramic tape to manipulate crosslinking of the binder;

casting the mixture of the ceramic powder, the binder and the binder-manipulating chemical agents as a tape;

said chemical agents being selected so as to control said crosslinking in a manner to limit any shrinkage of said tape to less than 0.04% over a period of 10 days to 2 weeks.

2. The method of claim 1 wherein the binder is selected from the group consisting of polyvinylformal, polyvinylacetal, polyvinylpropinal and polyvinylbutyral.

3. The method of claim 1 wherein the chemical agents added to the tape components accelerate crosslinking of the binder in the tape.

4. The method of claim 3 wherein the chemical agents added to the ceramic tape to accelerate crosslinking of the binder is a solvent used in the tape while the tape is a slip.

5. The method of claim 6 wherein the solvent is a ketone alcohol or other hydrocarbon.

6. The method of claim 5 wherein the solvent is a combination of acetone and acetylacetone.

7. The method of claim 5 further comprising the step of adding a polyhydroxy compound to accelerate the crosslinking reaction of the binder.

8. The method of claim 7 wherein the polyhydroxy compound is glycerine.

9. The method of claim 1 wherein the boron is rendered inoperative as a crosslinking agent for the binder in the tape.

10. The method of claim 9 wherein the boron is pre-reacted with a Lewis base prior to contact with the binder.

11. The method of claim 10 wherein the Lewis base is an organic amine.

12. The method of claim 11 wherein the Lewis base is piperidine.

* * * * *